United States Patent [19]
Iwase

[11] Patent Number: 5,515,362
[45] Date of Patent: May 7, 1996

[54] DIGITAL SIGNAL TRANSMISSION APPARATUS

[75] Inventor: Ryoichi Iwase, Tokyo, Japan

[73] Assignee: NEC Corporation, Tokyo, Japan

[21] Appl. No.: 358,615

[22] Filed: Dec. 14, 1994

[30]   Foreign Application Priority Data

Dec. 16, 1993   [JP]   Japan .................................. 5-317086

[51] Int. Cl.$^6$ ............................. H04J 3/14; H04L 1/00;
G06F 11/00
[52] U.S. Cl. ...................... 370/16; 370/105.3; 370/108;
340/825.01; 340/825.14; 375/371; 395/182.02
[58] Field of Search ............................. 370/13, 16, 16.1,
370/24, 54, 55, 94.1, 94.2, 100.1, 102,
105.2, 105.3, 108; 375/362, 363, 371, 375;
371/47.1, 49.1, 49.3; 395/181, 182.01, 182.02;
340/825.01, 825.03, 826, 827, 825.06, 825.14,
825.16, 825.18

[56]   References Cited

U.S. PATENT DOCUMENTS

| | | | |
|---|---|---|---|
| 4,451,916 | 5/1984 | Casper et al. | 370/16 |
| 5,146,477 | 9/1992 | Cantoni et al. | 375/363 |
| 5,299,234 | 3/1994 | Nakagawa et al. | 370/102 |
| 5,325,354 | 6/1994 | Hadano | 370/16 |
| 5,459,715 | 10/1995 | Furuta et al. | 370/16 |

FOREIGN PATENT DOCUMENTS 61-247142   11/1986   Japan.

OTHER PUBLICATIONS

CCITT Recommendation G.783; CM XV-R 41-E (75 pages).

*Primary Examiner*—Alpus H. Hsu
*Attorney, Agent, or Firm*—Whitham, Curtis, Whitham & McGinn

[57]   ABSTRACT

A digital signal transmission apparatus having a synchronous digital hierarchy interface having duplex channels is disclosed which prevents, when a code error occurs in a working channel, transmission of the signal including the code error to an apparatus connected at the next stage. The digital signal processing apparatus includes a pair of code error detection sections provided for the working channel and a protection channel each for detecting presence or absence of a code error of a virtual container signal in units of a frame using a result of calculation of a bit interleaved parity, and a frame memory provided for each of the working channel and the protection channel for delaying a signal, for which detection by the code error detection section has been performed, by one frame and outputting the delayed signal to a phase synchronizing section. A selector is switched in units of a frame in response to results of code error detection of a frame by the code error detection sections to extract one of a pair of outputs of the phase synchronization section.

3 Claims, 4 Drawing Sheets

DIGITAL SIGNAL TRANSMISSION APPARATUS

BACKGROUND OF THE INVENTION

1. Field of the Invention

This invention relates to a digital signal transmission apparatus, and more particularly to a transmission line switching method for a digital signal transmission apparatus having a synchronous digital hierarchy (SDH) interface specified in the CCITT Recommendation G.707, G.708 and G.709.

2. Description of the Related Art

Conventionally, in a transmission line switching method for a transmission apparatus of the type mentioned, when the synchronous transfer mode (STM) level exhibits an abnormal level continuously for a fixed period of time, that is, when the rate of code errors of a receive signal detected by supervision of a section overhead (SOH) exhibits a level higher than a certain threshold level for more than the fixed period of time, switching using an automatic protection switching (APS) byte of the section overhead (SOH) is performed in accordance with the CCITT Recommendation G.783.

Further, in a SDH interface, the following method is employed as a code error detection method for a VC-3 signal (VC bit rate: 48.960 Mb/s) or a VC-4 signal (VC bit rate: 150.336 Mb/s) which is a high order virtual container.

In an apparatus which produces and sends out a VC-3 signal or a VC-4 signal, a bit interleaved parity of 8 bits (BIP-8) is calculated in units of a frame, and a result of the calculation is inserted into a B3 byte of a path overhead (POH) of a next frame as illustrated in FIG. 4. In an apparatus for receiving such VC-3 or VC-4 signal, a BIP-8 is calculated in units of a frame, and a result of the calculation and a B3 byte of a next frame are compared with each other to detect a code error in units of a frame.

As one of switching systems for a digital transmission line whose application is not limited only to a SDH transmission apparatus, a system disclosed in, for example, Japanese Patent Laid-Open Application No. Showa 61-247142 is known. FIG. 3 illustrates the digital transmission line switching system disclosed in the publication mentioned above.

A 0 system channel supervisory circuit 101 which is a working system used at present and a 1 system channel supervisory circuit 102 which serves as a protection system supervise receive signals of a 0 system transmission line or channel and a 1 system transmission line or channel, respectively. A phase synchronization section 103 synchronizes the phases of frames and bits of the two signals and outputs the two signals in a same phase to a selector 104. A selector control section 105 switches the selector 104 in response to control signals from the 0 system channel supervisory circuit 101 and the 1 system channel supervisory circuit 102. In particular, when an abnormal condition is detected by the 0 system channel supervisory circuit 101, the selector 104 selects the receive signal of the 1 system channel, but when an abnormal condition such as a code error is detected by the 1 system channel supervisory circuit 102, the selector 104 selects the receive signal of the 0 system channel. Since the phases of the signals inputted by way of the two channels to the selector 104 are coincident with each other, the output of the selector 104 does not exhibit a phase jump upon switching.

However, where the conventional switching system described above is applied to a transmission apparatus having a SDH interface, that is, where objects for synchronizing in phase are VC-3 or VC-4 signals and parity calculation (BIP-8) in units of a frame of a VC-3 or VC-4 signal is employed as supervisory means for a channel, even if a code error occurs in a channel which is currently selected by the selector, such code error cannot be detected until after a parity calculation for the one frame is completed. Consequently, before the code error is detected actually, the VC-3 or VC-4 frame which includes the code error is outputted from the selector, and an apparatus connected at the next stage receives the signal which includes the code error although interruption of the receive signal which may be caused by a phase jump upon switching does not take place.

SUMMARY OF THE INVENTION

It is an object of the present invention to provide a digital signal transmission apparatus which eliminates, when a code error occurs with a receive signal from a working channel but no code error occurs with another receive signal from a protection channel, the code error from being included in the output signal of a selector thereby to prevent transmission of the signal which includes the code error to an apparatus connected at the next stage.

In order to attain the object described above, according to the present invention, there is provided a digital signal processing apparatus, which comprises a pair of supervisory circuits for individually supervising a pair of receive signals from a working channel and a protection channel, a phase synchronization section for synchronizing the phases of frames and bits of the receive signals from the working channel and the protection channel and outputting the receive signals in a same phase, a selector for selectively outputting one of the signals from the phase synchronization section, a selector control circuit for selecting, when an abnormal condition detection signal is sent out from one of the supervisory circuits, the receive signal from a normal one of the supervisory circuits to the selector, code error detection means provided for each of the working channel and the protection channel for detecting presence or absence of a code error of a virtual container signal in units of a frame using a result of calculation of a bit interleaved parity, and a frame memory provided for each of the working channel and the protection channel for delaying a signal, for which detection by the code error detection means has been performed, by one frame and outputting the delayed signal to the phase synchronizing section, the selector control section including means for switching the selector in units of a frame in response to results of code error detection of a frame by the code error detection means.

The selector control section switches the selector to the protection transmission line side when the result of detection of the code error detection means of the working channel side indicates presence of a code error, but does not switch the selector when the results of detection of the code error detection means of both of the working channel side and the protection channel side.

Preferably, the code error detection means includes a section overhead trailing end detection section for detecting a trailing end of a section overhead, a pointer processing section for processing a pointer of a virtual container signal, and an error detection section for calculating a bit interleaved parity of the virtual container signal in units of a frame and comparing the calculated bit interleaved parity with a result of calculation of a next frame to detect a code error.

In the digital signal transmission apparatus, a VC-3 signal or VC-4 signal according to the CCITT Recommendation G.783 from each of the working channel and the protection channel is held in the corresponding frame memory so that it is delayed by one frame. The corresponding code error detection means calculates a bit interleaved parity (BIP-8) of the VC-3 signal or VC-4 signal in units of a frame and compares the thus calculated bit interleaved parity (BIP-8) with a B3 byte, which is a result of calculation of a bit interleaved parity of a next frame and has been inserted into the next frame by a transmission apparatus which transmits the VC-3 signal or VC-4 signal, to detect a code error. The phase synchronization section synchronizes the phases of frames and bits of the output signals of the two frame memories and outputs the thus synchronized signals in a same phase to the selector. The selector control section switches the selector in units of a frame in response to error information detected by the B3 error detection sections of the supervisory circuits and phase information from the phase synchronization section. In particular, when the code error detection means corresponding to the working channel detects a code error while the working channel is currently selected by the selector, the selector control section switches the selector to the protection channel at a timing at which the corresponding frame is inputted to the selector so far as a corresponding frame of the receive signal of the protection channel does not include a code error.

In this manner, since the digital signal transmission apparatus includes the frame memories for one frame of a VC-3 or VC-4 signal and switching between the working channel and the protection channel is performed in units of a frame using a result of code error detection using a B3 byte, a signal which includes a code error is not outputted from the selector before a code error of the working channel is detected. Accordingly, so far as a corresponding frame of the protection channel does not include a code error, transmission of a signal which includes a code error to an apparatus connected at the next stage to the digital signal transmission apparatus can be prevented.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
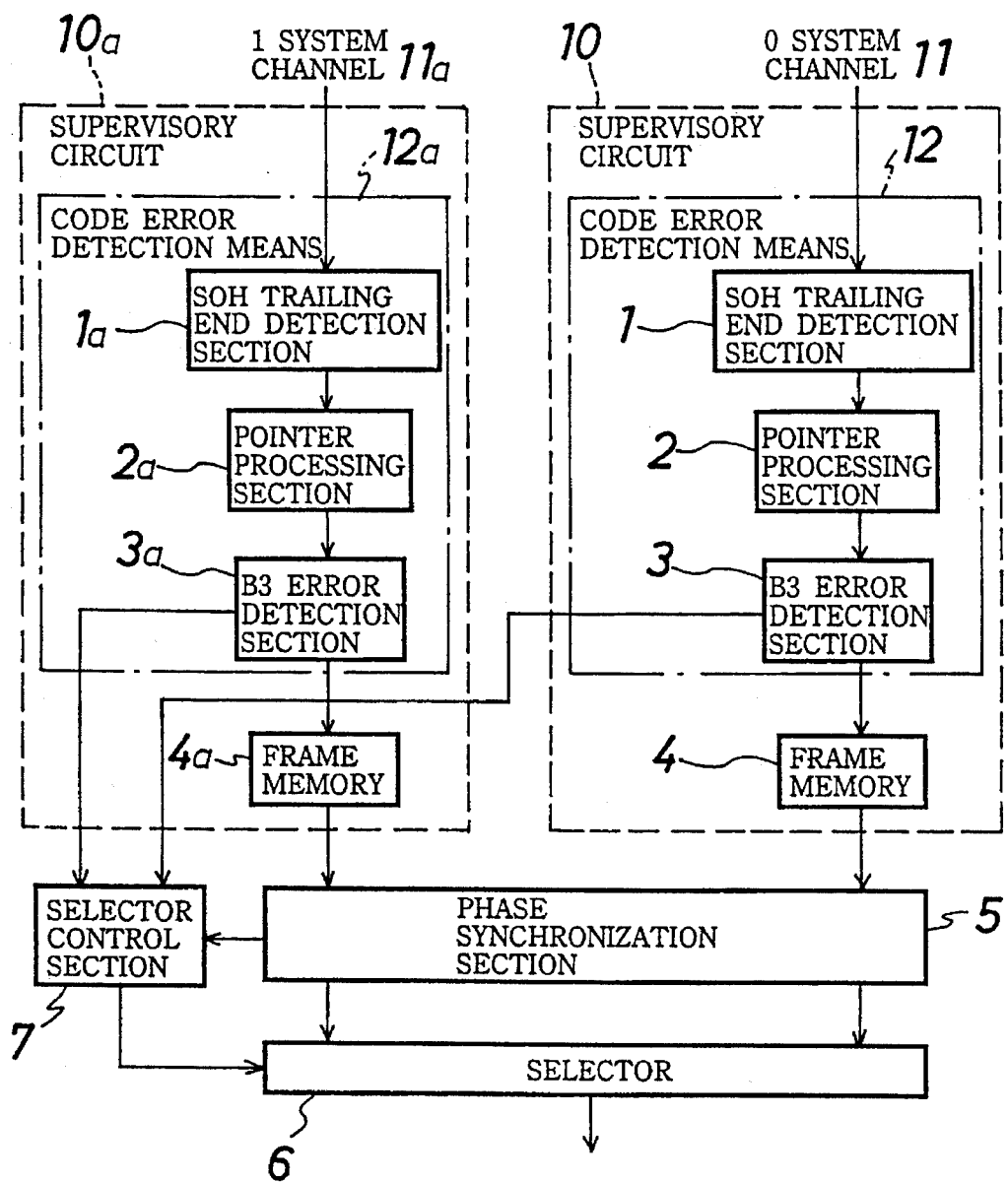
FIG. 1 is a block diagram of a digital signal processing apparatus showing a preferred embodiment of the present invention.

Referring first to FIG. 1, there is shown a digital signal processing apparatus to which the present invention is applied. The digital signal transmission apparatus shown includes a pair of supervisory circuits 10 and 10a for individually supervising receive signals from a 0 system transmission line or channel 11 which is a working channel used at present and a 1 system transmission line or channel 11a serving as a protection channel, respectively, a phase synchronization section 5 for synchronizing the phases of frames and bits of the receive signals from the 0 system channel 11 and the 1 system channel 11a and outputting the signals in a same phase, a selector 6 for selectively outputting one of the signals from the phase synchronization section 5, and a selector control section 7 for controlling the selector 6 to select, when an abnormal condition detection signal is sent out from one of the supervisory circuits 10 and 10a, the receive signal from a normal one of the channels, that is, the receive signal from which the abnormal condition has not been detected.

Each of the supervisory circuits 10 and 10a includes code error detection means 12 or 12a for detecting a code error of a frame using a calculation result (B3 byte) of a bit interleaved parity of 8 bits (BIP-8) constituting a frame unit of a VC-3 or VC-4 signal specified in the CCITT Recommendation G.709, and a frame memory 4 or 4a having a capacity sufficient to delay a VC-3 or VC-4 signal by one frame and adapted to hold a signal from the code error detection means 12 or 12a. Meanwhile, the selector control section 7 includes means for switching the selector 6 in units of a frame in response to results of code error detection of a frame by the supervisory circuits 10 and 10a.

In the present embodiment, each of the code error detection means 12 and 12a includes a trailing end detection section 1 or 1a for detecting a trailing end of a section overhead (SOH), a pointer processing section 2 or 2a for processing a pointer of a VC-3 or VC-4 signal, and a B3 error detection section 3 or 3a for calculating a bit interleaved parity (BIP-8) of a VC-3 or VC-4 signal in units of a frame and comparing the thus calculated bit interleaved parity (BIP-8) with a result of calculation for a next frame to detect a code error.

In operation, receive signals of the 0 system channel 11 and the 1 system channel 11a are inputted to the frame memories 4 and 4a by way of the trailing end detection sections 1 and 1a, the pointer processing sections 2 and 2a and the B3 error detection sections 3 and 3a, respectively. Each of the frame memories 4 and 4a has a memory capacity sufficient to delay a VC-3 or VC-4 signal by one frame, that is, a memory capacity for one frame or more. Each of the B3 error detection sections 3 and 3a calculates a bit interleaved parity (BIP-8) of a VC-3 or VC-4 signal in units of a frame and compares the result of calculation with a result of calculation for a next frame, that is, the B3 byte of the next frame inserted by a transmission apparatus not shown to detect a code error. Thus, when the B3 error detection section 3 or 3a detects a code error, it is determined that the VC-3 or VC-4 frame inputted in the frame memory 4 or 4a includes a code error.

The phase synchronization section 5 synchronizes the phases of frames and bits of the output signals of the frame memories 4 and 4a and outputs the signals in a same phase to the selector 6. The selector control section 7 switches the selector 6 in units of a frame in response to error information detected by the B3 error detection sections 3 and 3a and phase information from the phase synchronization section 5. In particular, when the B3 error detection section 3 detects a code error while the 0 system channel 11 is currently selected by the selector 6, the selector control section 7 switches the selector 6 to the 1 system at a timing at which the corresponding frame is inputted to the selector 6 so far as a corresponding frame of the receive signal of the other 1 system channel 11*a* does not include a code error.

In this manner, when a code error is detected by the B3 error detection section 3 or 3*a*, since the frame which includes the code error is held within the frame memory 4 or 4*a*, a signal which includes any code error will not be outputted from the selector 6 before a code error is detected.

Figure 2:
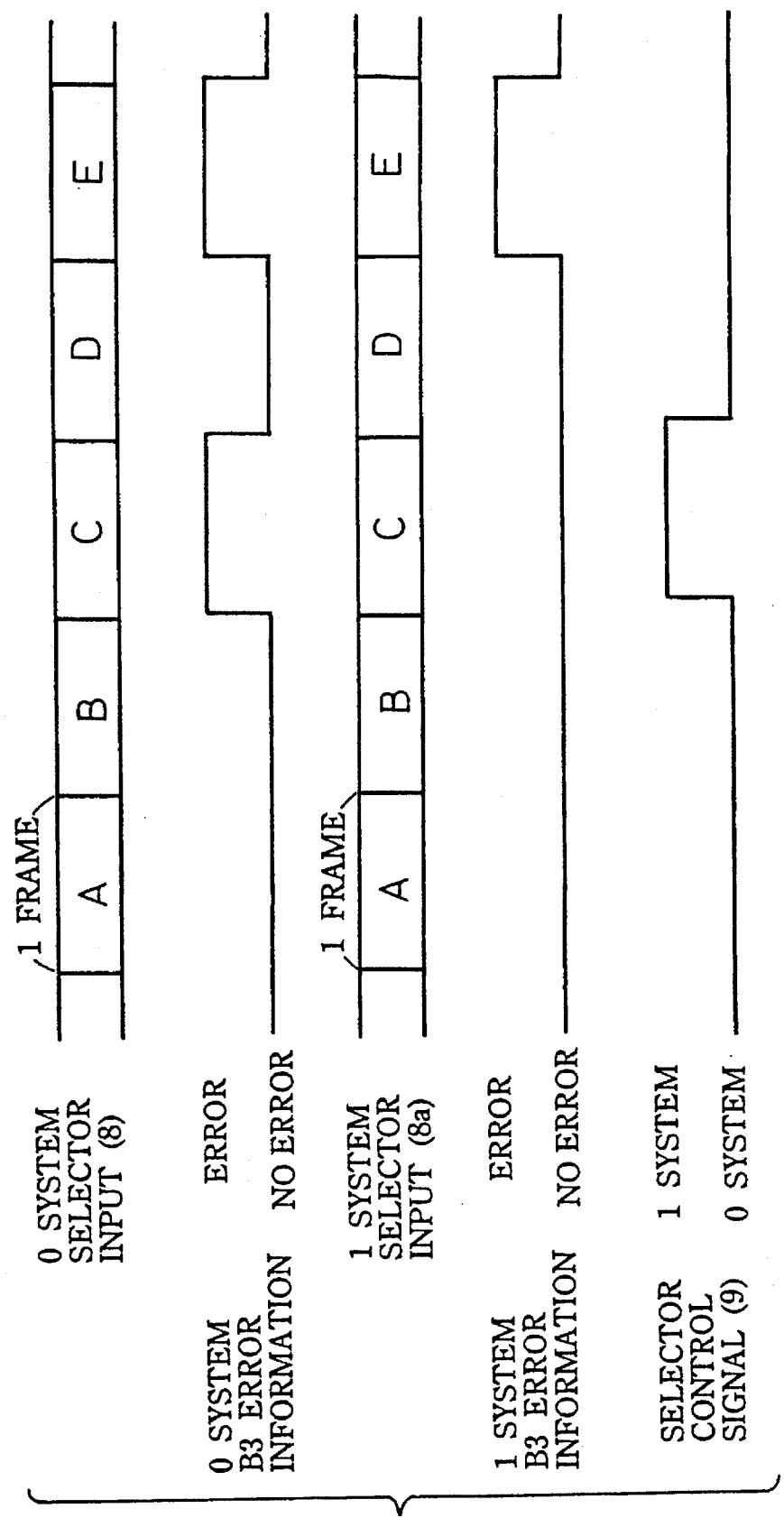
FIG. 2 is a time chart illustrating operation of the digital signal transmission apparatus of FIG. 1.
Figure 3:
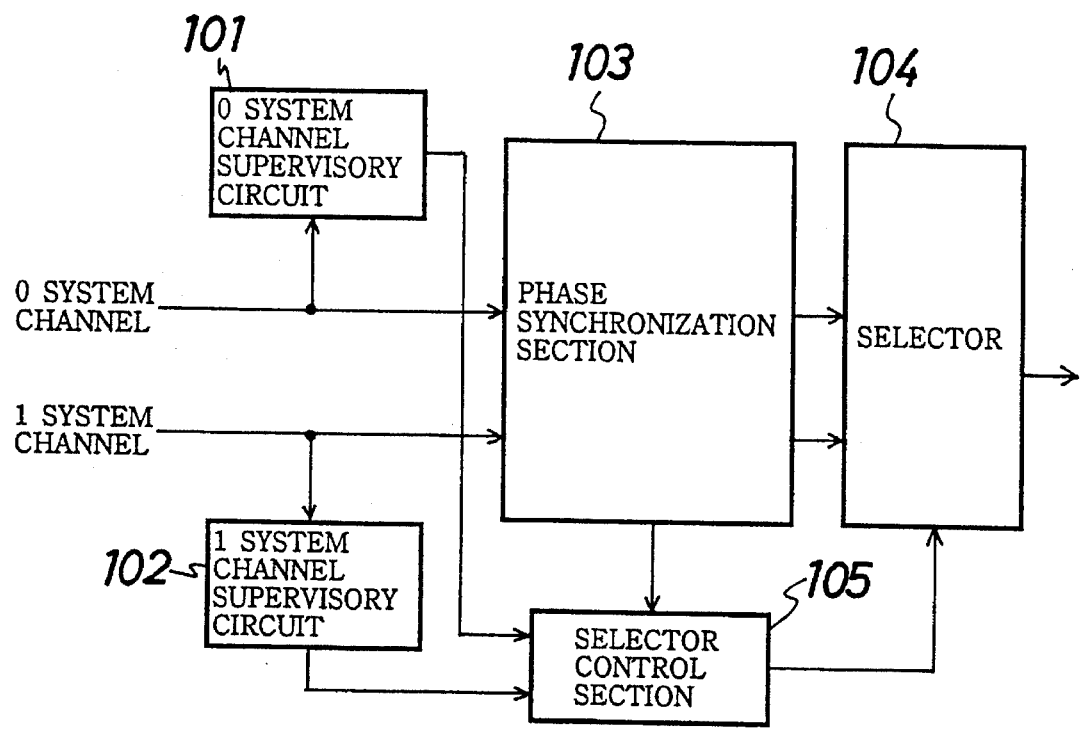
FIG. 3 is a block diagram showing a conventional digital signal transmission apparatus.
Figure 4:
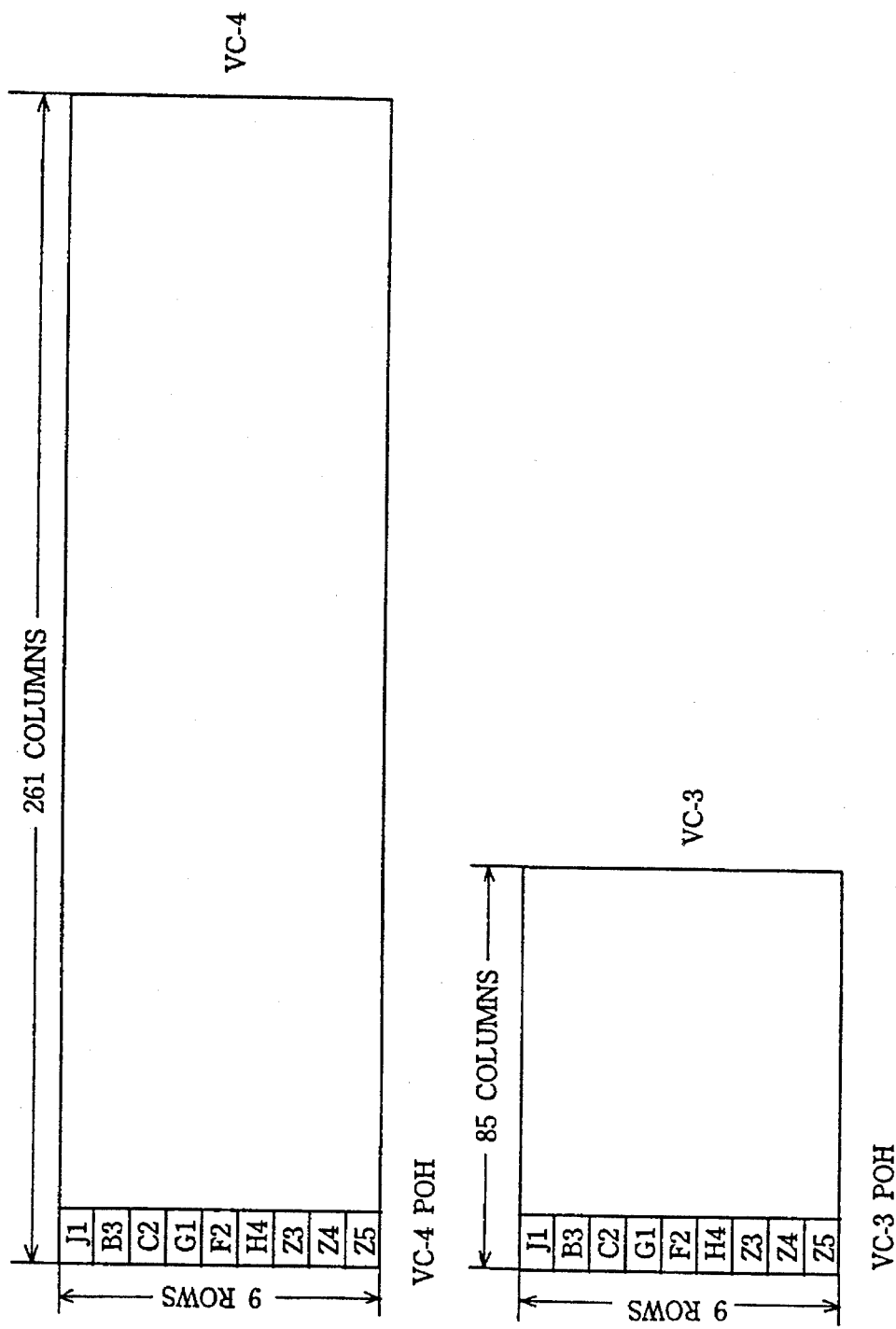
FIG. 4 is a diagrammatic view of two-dimensional byte arrangements showing frame structures of VC-3 and VC-4 signals specified in the CCITT Recommendation G.709.

An example of selector control is illustrated in FIG. 2. In the example shown, it is assumed that the selector in a normal condition selects the 0 system. Since the two 0 and 1 systems include no error in frames A, B and D, the selector 6 selects the 0 system. However, when an error is detected in a frame C of the 0 system, the selector 6 selects the 1 system in the frame. Further, in a frame E, since an error is detected in both of the two systems, the selector 6 remains selecting the 0 system.

Having now fully described the invention, it will be apparent to one of ordinary skill in the art that many changes and modifications can be made thereto without departing from the spirit and scope of the invention as set forth herein.

What is claimed is:

1. A digital signal processing apparatus, comprising:

a pair of supervisory circuits for individually supervising a pair of receive signals from a working channel and a protection channel;

a phase synchronization section for synchronizing the phases of frames and bits of the receive signals from said working channel and said protection channel and outputting the receive signals in a same phase;

a selector for selectively outputting one of the signals from said phase synchronization section;

a selector control circuit for selecting, when an abnormal condition detection signal is sent out from one of said supervisory circuits, the receive signal from a normal one of said supervisory circuits to said selector;

code error detection means provided for each of said working channel and said protection channel for detecting presence or absence of a code error of a virtual container signal in units of a frame using a result of calculation of a bit interleaved parity; and a frame memory provided for each of said working channel and said protection channel for delaying a signal, for which detection by said code error detection means has been performed, by one frame and outputting the delayed signal to said phase synchronizing section;

said selector control section including means for switching said selector in units of a frame in response to results of code error detection of a frame by said code error detection means.

2. A digital signal transmission apparatus as claimed in claim 1, wherein said selector control section switches said selector to said protection transmission line side when the result of detection of said code error detection means of said working channel side indicates presence of a code error, but does not switch said selector when the results of detection of said code error detection means of both of said working channel side and said protection channel side indicate presence of code errors.

3. A digital signal transmission apparatus as claimed in claim 1, wherein said code error detection means includes a section overhead trailing end detection section for detecting a trailing end of a section overhead, a pointer processing section for processing a pointer of a virtual container signal, and an error detection section for calculating a bit interleaved parity of the virtual container signal in units of a frame and comparing the calculated bit interleaved parity with a result of calculation of a next frame to detect a code error.

* * * * *